(12) United States Patent
Chang et al.

(10) Patent No.: US 8,970,693 B1
(45) Date of Patent: Mar. 3, 2015

(54) SURFACE MODELING WITH STRUCTURED LIGHT

(75) Inventors: Samuel Henry Chang, Jose, CA (US); Christopher Coley, Morgan Hill, CA (US); William Spencer Worley, III, Half Moon Bay, CA (US)

(73) Assignee: Rawles LLC, Wilmington, DE (US)

( * ) Notice: Subject to any disclaimer, the term of this patent is extended or adjusted under 35 U.S.C. 154(b) by 660 days.

(21) Appl. No.: 13/327,141

(22) Filed: Dec. 15, 2011

(51) Int. Cl.
| H04N 7/18 | (2006.01) |
| G06T 19/00 | (2011.01) |
| G06T 7/00 | (2006.01) |
| G06T 15/20 | (2011.01) |

(52) U.S. Cl.
CPC .............. *G06T 19/006* (2013.01); *G06T 7/0057* (2013.01); *G06T 15/20* (2013.01)
USPC ........................................................ 348/136

(58) Field of Classification Search
CPC .............................. G06T 19/006; G06T 15/207
USPC ........................................................ 348/136
See application file for complete search history.

(56) References Cited

U.S. PATENT DOCUMENTS

| 5,477,332 | A  | * | 12/1995 | Stone et al. .................... 356/613 |
| 6,556,195 | B1 | * | 4/2003  | Totsuka et al. ................ 345/419 |
| 6,754,370 | B1 | * | 6/2004  | Rusinkiewicz et al. ....... 382/106 |
| 7,182,465 | B2 | * | 2/2007  | Fuchs et al. ..................... 353/69 |
| 7,336,814 | B2 | * | 2/2008  | Boca et al. ..................... 382/141 |
| 7,957,583 | B2 | * | 6/2011  | Boca et al. ..................... 382/154 |
| 8,437,506 | B2 | * | 5/2013  | Williams et al. .............. 382/103 |
| 8,565,479 | B2 | * | 10/2013 | Gurman et al. ............... 382/103 |
| 2006/0017720 | A1 | * | 1/2006  | Li ................................... 345/419 |
| 2006/0140446 | A1 | * | 6/2006  | Luo et al. ....................... 382/104 |
| 2007/0086656 | A1 | * | 4/2007  | Higaki .......................... 382/199 |
| 2007/0285554 | A1 | * | 12/2007 | Givon ........................... 348/340 |
| 2008/0123937 | A1 | * | 5/2008  | Arias Estrada et al. ........ 382/154 |
| 2008/0225041 | A1 | * | 9/2008  | El Dokor et al. .............. 345/419 |
| 2008/0279446 | A1 | * | 11/2008 | Hassebrook et al. .......... 382/154 |
| 2009/0304299 | A1 | * | 12/2009 | Motomura et al. ............ 382/254 |
| 2010/0177163 | A1 | * | 7/2010  | Yang et al. ...................... 348/45 |
| 2010/0185529 | A1 | * | 7/2010  | Chesnut et al. ................. 705/27 |
| 2010/0194862 | A1 | * | 8/2010  | Givon ............................. 348/49 |
| 2010/0208050 | A1 | * | 8/2010  | Wadman ......................... 348/77 |
| 2010/0315422 | A1 | * | 12/2010 | Andre et al. .................. 345/426 |
| 2011/0102551 | A1 | * | 5/2011  | Iwasaki et al. ................. 348/46 |
| 2011/0261050 | A1 | * | 10/2011 | Smolic et al. ................. 345/419 |
| 2012/0082383 | A1 | * | 4/2012  | Kruglick ....................... 382/195 |
| 2012/0086783 | A1 | * | 4/2012  | Sareen .......................... 348/47 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Sath V Perungavoor
*Assistant Examiner* — Peter D Le
(74) *Attorney, Agent, or Firm* — Lee & Hayes, PLLC

(57) ABSTRACT

Structured light patterns are projected onto an object and images of the structured light interacting with the surface of the object are acquired, as well as grayscale information. Edges within the structured light patterns are detected and depth sample points on the edges are used to determine distance to those sample points. The grayscale information is used to construct surface normals. From these normals relative surface contours such as curves or slopes may be determined. A model of a surface of the object is generated using the distances and the contours.

19 Claims, 8 Drawing Sheets

SURFACE MODELING WITH STRUCTURED LIGHT

BACKGROUND

Augmented reality environments allow interaction among users and real-world objects and virtual or computer-generated objects and information. This merger between the real and virtual worlds paves the way for new interaction opportunities. Traditional structured light systems have suffered from low resolution, producing relatively coarse surface models of scanned objects. These low resolution systems may not be able to adequately distinguish smaller features, such as fingers on a human hand or small objects in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
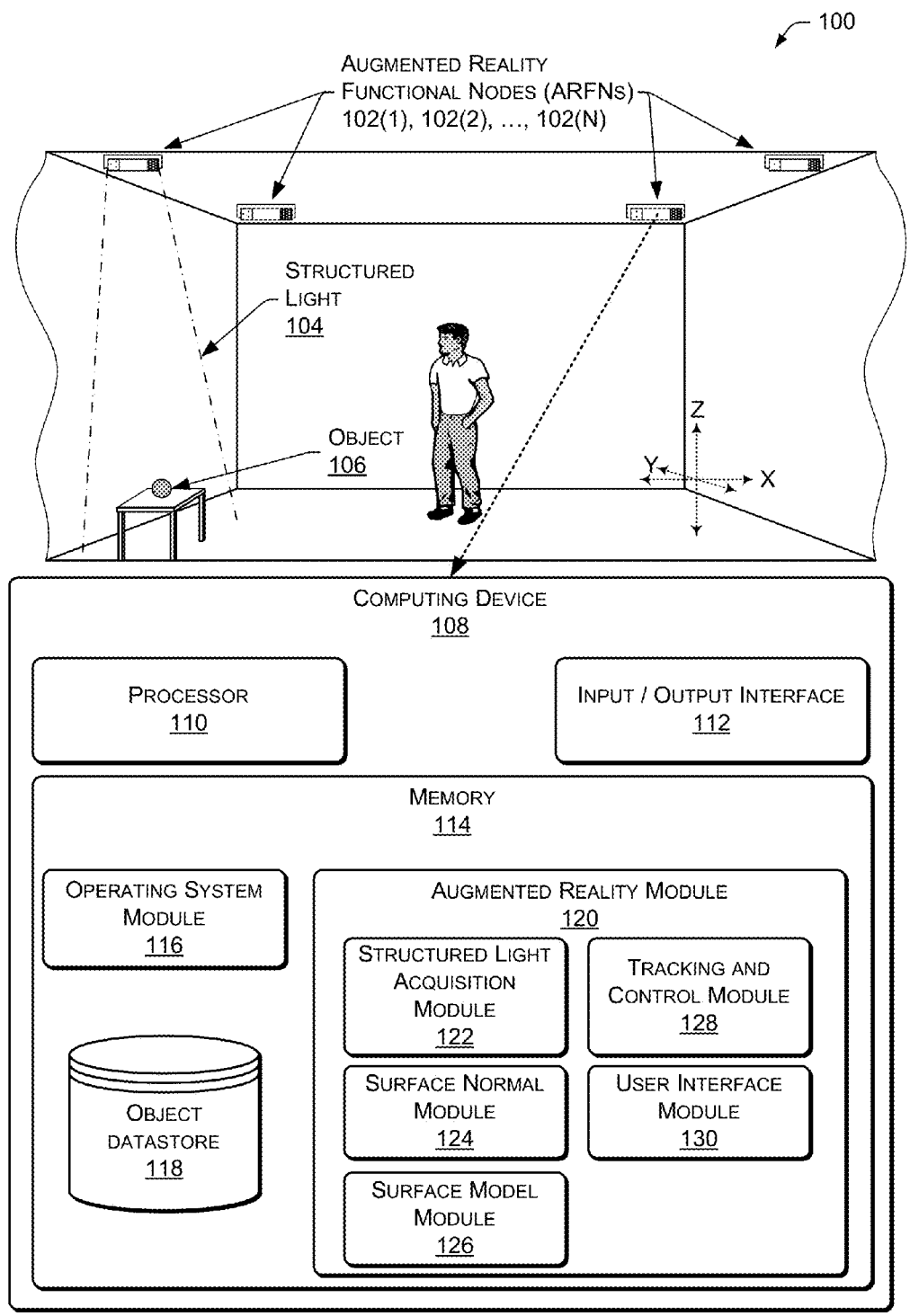
FIG. 1 shows an illustrative augmented reality environment which includes an augmented reality functional node and an associated computing device with an augmented reality module.

An augmented reality system may be configured to interact with objects in a scene and generate an augmented reality environment. The augmented reality environment allows for virtual objects and information to merge and interact with tangible real-world objects, and vice versa. Disclosed herein are techniques and devices suitable for reconstructing three-dimensional shapes of objects within the augmented reality environment. This shape data may be used to determine changes in the physical environment, such as when a shape of an object has changed. These changes may be used for input. For example, a hand gesture by a user may be used as input to initiate an action in the augmented reality environment.

As described herein for illustration and not by way of limitation, the augmented reality environment may be provided at least in part by a combination of a structured light source, such as an image projector or other light source configured to generate structured light patterns and a camera to image those patterns. The projector and camera may further be incorporated into a single unit and designated as an augmented reality functional node (ARFN). In other implementations, other combinations of elements such as projectors, video displays, computer screens, cameras, microphones, ultrasound transducers, depth-sensing devices, weight sensors, touch sensors, tactile output devices, and so forth may be also be present within or coupled to the ARFN.

The augmented reality system includes a computing device with an augmented reality module configured to support the augmented reality environment. The augmented reality module may contain or couple to several modules. A structured light acquisition module is configured to use light patterns projected onto an object in the scene to determine depth or distance information to one or more depth sample points on the object. Distance data may be determined accurately, but due to equipment and structured light pattern constraints such as pattern size and placement of edges in the pattern, fine grained depth data, such as at a pixel level, is typically unavailable. A surface normal module is configured to use a grayscale image of the object and determine surface normals. These surface normals provide data about relative orientation and contour of a particular section on the object. Surface normals and corresponding slope or curve may be determined at an individual pixel level.

A surface model module is configured to combine the structured light depth data along with the contours resulting from the surface normals to generate a model of at least a portion of the object's surface. This model generation may also be referred to as reconstruction of the three-dimensional surface.

Once a shape of the object has been determined, that information may be used as input. A tracking and control module may recognize a hand and associate particular hand locations or gestures with particular inputs. For example, the user pointing to something presented on a display or projected on a surface may be accepted as input. The tracking and control module may follow the user's hand and await particular gestures or hand shapes to use as input. A user interface module may be configured to alter presentation of data using the projector, interpret particular gestures as being associated with particular commands, and so forth.

To maintain accuracy, aid in initial configuration, and so forth, the system described herein may be calibrated. The calibration may use a known reference object, or use information from other sensors.

Illustrative Environment

FIG. 1 shows an illustrative augmented reality environment 100. The environment 100 includes one or more augmented reality functional nodes (ARFNs) 102(1), 102(2), ... , 102(N) with associated computing devices. In this illustration, multiple ARFNs 102(1)-(N) are positioned in the corners of the ceiling of the room. In other implementations, the ARFNs 102(1)-(N) may be positioned in other locations within the scene. When active, one such ARFN 102 may generate an augmented reality environment incorporating some or all of the items in the scene such as real-world objects. In some implementations, more or fewer ARFNs 102(1)-(N) than shown here may be used.

The ARFNs 102 may use structured light 104 to scan an object 106. This scan may comprise projecting two or more structured light patterns one at a time onto the scene and imaging the patterns during interaction with the object. The structured light 104 thus illuminates or overlays the object 106. Structured light is described in more detail below.

Each of the ARFNs 102(1)-(N) couples to or includes a computing device 108. This computing device 108 may be within the ARFN 102, or disposed at another location and connected to the ARFN 102. The computing device 108 comprises a processor 110, an input/output interface 112, and a computer-readable storage media (CRSM) 114. The processor 110 may comprise one or more processors configured to execute instructions. The instructions may be stored in the CRSM 114, or in other computer-readable storage media accessible to the processor 110.

The input/output interface 112 may be configured to couple the computing device 108 to other components such as projector, cameras, microphones, other ARFNs 102, other computing devices, other devices within the augmented reality environment, and so forth. For example, the input/output interface 112 may be configured to exchange data with computing devices, cleaning robots, home automation devices, and so forth in the environment. The coupling between the computing device 108 and the devices may be via wire, fiber optic cable, or wireless connection including but not limited to radio frequency, optical, or acoustic signals.

The computer-readable storage media 114 includes any available physical media accessible by a computing device to implement the instructions or read the data stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 114 and configured to execute on a processor, such as the processor 110. An operating system module 116 is configured to manage hardware and services within and coupled to the computing device 108 for the benefit of other modules. Modules may be stored in the CRSM 114 of the ARFN 102, storage devices accessible on the local network, cloud storage accessible via a wide area network, or distributed across a combination thereof.

An object datastore 118 is configured to maintain information about objects within or accessible to the augmented reality environment or users. These objects may be tangible real world objects or virtual objects. Tangible objects include items such as tables, chairs, animals, plants, food containers, printed books, and so forth. Virtual objects include media content such as songs, movies, electronic books, computer generated scenes, media files, and so forth. Virtual objects may include stored copies of those objects or access rights thereto. The object datastore 118 may include a library of pre-loaded reference objects, as well as objects which are temporally persistent within a particular environment, such as a wall, a specific table, a user and so forth. For tangible objects, surface shapes, textures, colors, and other characteristics may be stored.

The object datastore 118 or other datastores may be stored on one or more of the CRSM 114 of the ARFN 102, storage devices accessible on the local network, cloud storage accessible via a wide area network, or distributed across one or more of these. Data within the object datastore 118 may be stored in hierarchical, non-hierarchical, or hybrid arrangements.

An augmented reality module 120 is configured to maintain an augmented reality environment in concert with the physical environment. The module 120 may access datastores such as the object datastore 118.

The augmented reality module 120 includes a structured light acquisition module 122. The structured light acquisition module 122 is configured to direct a projector and a camera (such as described below with regards to FIG. 2) to project one or more structured light patterns onto the object 106 and acquire images of the structured light pattern as it interacts with the object.

The structured light patterns may be regular, irregular, pseudorandom noise, and so forth. For example, a regular structured light pattern may comprise a set of bars having alternate intensities, colors, and so forth. When projected onto an object in the scene, this pattern may shift, distort, or change in size after interacting with the object. These features may include edges or other distinctive arrangements which may be used to provide for recovery of the originally projected pattern and any corresponding distortion. As used herein, an edge is a transition from one state to another, such as a first pixel having a high intensity (bright) adjacent to a second pixel having a low intensity (dim). The low intensity may be non-zero. For example, the edge may be visualized as an interface between a bright bar and a dim bar in a projected pattern. Structured light patterns are discussed in more detail below with regards to FIG. 3.

A surface normal module 124 is configured to use grayscale images to determine surface normals of objects in the scene. Grayscale images are monochromatic with each pixel expressing a particular value of intensity information. This intensity information is configured to express three or more different intensity levels, such as light, medium, and dark. Intensity information is thus available down to an individual pixel level in an acquired image. In some implementations the grayscale image may be derived from particular color channels. For example, a grayscale image may be generated from a red, green, or blue channel acquired by an imager. In other implementations, the grayscale image may be generated using a combination of different colors.

The surface normal module 124 may utilize techniques such as photometric stereo to estimate surface normals of the object 106 based at least in part on the intensity data present in the grayscale image. A surface normal, also known as a "normal," is a line that is perpendicular to a surface. In some implementations, the surface normal module 124 may assume that the object 106 posses a Lambertian reflectance. Lambertian reflectance assumes that the surface luminance is isotropic. In other implementations, other surface assumptions may be used. Determination of the surface normal is described below in more detail with regard to FIG. 4.

A surface model module 126 is configured to accept the depth data resulting from the structured light acquisition module 122 and combine this with the contour data derived from the surface normals provided by the surface normal module 124 to generate a surface model. A surface model describes an exterior topography of at least a portion of an object. The surface model thus describes a shape of the object. The process of surface modeling is described in more detail below with regards to FIGS. 5 and 6.

The augmented reality module 120 may include a tracking and control module 128 is configured to identify objects including users, and follow their location in the environment. This identification may include the use of a camera, structured light, radio frequency identification equipment, communication with the object, and so forth within the ARFN 102. Objects may be identified by comparing attributes in the object datastore 118 such as shape, text thereon, universal product code (UPC), object behaviors (including an ability to move independently), optical barcode, radio frequency identification tag (RFID), and so forth. Where the object is capable of communication, it may exchange information with the ARFN 102, and such information may be stored within the object datastore 118. The tracking and control module 128 may also be configured to send instructions or commands to other devices, such as environmental controls, lighting, robots, and so forth.

A user interface module 130 may be in the augmented reality module 120 which is configured to accept and interpret input such as received by the tracking and control module 128 and the surface model module 126 and generate output for the user. The ARFN 102 may use a camera, structured light, stereoscopic vision, and so forth to read the input from the user. This input may also comprise hand or facial gestures determined by the surface model module 126. The user interface module 130 may perform functions such as initiating a query of the object datastore 118. For example, a user may query the object datastore 118 via the user interface module 130 to locate his misplaced sunglasses.

Figure 2:
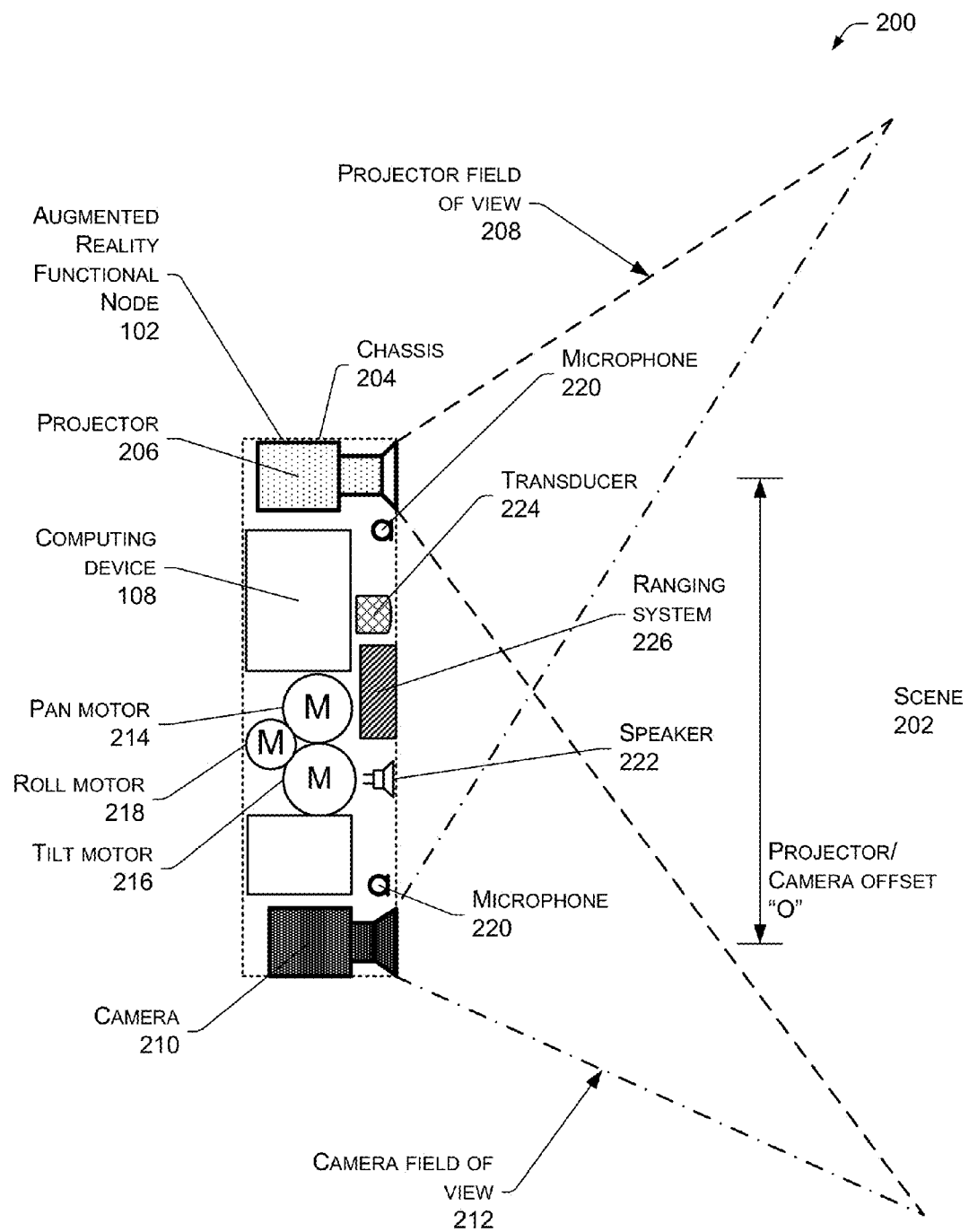
FIG. 2 shows an illustrative augmented reality functional node that includes a computing device, along with other selected components configured to generate and maintain an augmented reality environment.

FIG. 2 shows an illustrative schematic 200 of one example augmented reality functional node 102 and selected components. The ARFN 102 is configured to scan at least a portion of a scene 202 and the objects therein, such as the object 106 sitting on the table as shown in FIG. 1. The ARFN 102 may also be configured to provide augmented reality output, such as images, sounds, and so forth.

A chassis 204 holds the components of the ARFN 102. Within the chassis 204 may be disposed a projector 206 that projects images onto the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 or other displays such as televisions, monitors, and so forth may be used.

A camera 210 may also be disposed within the chassis 204. The camera 210 is configured to image the scene in visible light wavelengths, non-visible light wavelengths, or both. For example, in one implementation the camera 210 may be configured to generate a thermal image as well as a visible light image. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, a roll motor 218, and so forth. The pan motor 214 is configured to rotate the chassis 204 in a yawing motion. The tilt motor 216 is configured to change the pitch of the chassis 204. The roll motor 218 is configured to rotate the chassis 204 in a rolling motion. By panning, tilting, and/or rolling the chassis 204, different views of the scene may be acquired.

One or more microphones 220 may be disposed within the chassis 204, or elsewhere within the scene. These microphones 220 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival or other techniques among the microphones.

One or more speakers 222 may also be present to provide for audible output. For example, the speakers 222 may be used to provide output from a text-to-speech module or to playback pre-recorded audio.

A transducer 224 may be present within the ARFN 102, or elsewhere within the environment, and configured to detect and/or generate inaudible signals, such as infrasound or ultrasound. For example, the transducer 224 may be configured to detect a characteristic ultrasonic sound signature produced by keys on a keyring. Inaudible signals may also be used to provide for signaling between accessory devices and the ARFN 102.

A ranging system 226 may also be provided in the ARFN 102. The ranging system 226 is configured to provide distance information from the ARFN 102 to a scanned object or set of objects. The ranging system 226 may comprise radar, light detection and ranging (LIDAR), ultrasonic ranging, stereoscopic ranging, and so forth. In some implementations the transducer 224, the microphones 220, the speaker 222, or a combination thereof may be configured to use echolocation or echo-ranging to determine distance and spatial characteristics.

In this illustration, the computing device 108 is shown within the chassis 204. However, in other implementations all or a portion of the computing device 108 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera constant offset designated "O". This is a constant distance between the projector 206 and the camera 210. Placement of the projector 206 and the camera 210 at distance "O" from one another aids in the recovery of structured light data from the scene. The known projector/camera constant offset "O" may also be used to calculate distances, for providing an offset source for photometric stereo, dimensioning, and otherwise aid in the characterization of objects within the scene 202. In other implementations the relative angle and size of the projector field of view 208 and camera field of view 212 may vary with a condition that the projector field is covered by the camera view. Also, the angle of the projector 206 and the camera 210 relative to the chassis 204 may vary.

In other implementations, the components of the ARFN 102 may be distributed in one or more locations within the environment 100. As mentioned above, microphones 220 and speakers 222 may be distributed throughout the scene. The projector 206 and the camera 210 may also be located in separate chassis 204. The ARFN 102 may also include discrete portable signaling devices used by users to issue inputs.

These signal devices may be acoustic clickers (audible or ultrasonic), electronic signaling devices such as infrared emitters, radio transmitters, and so forth.

Figure 3:
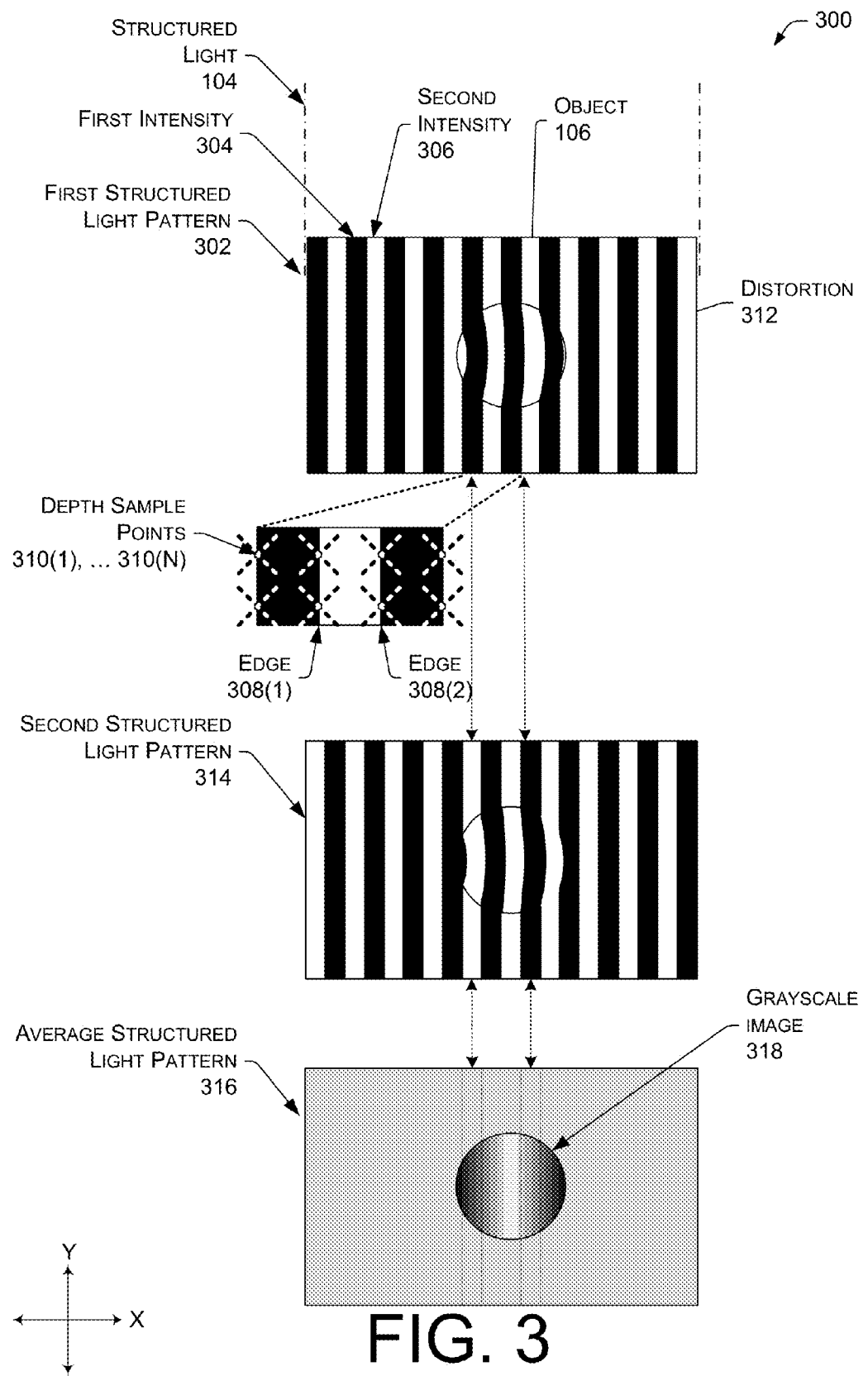
FIG. 3 illustrates a plurality of structured light patterns scanning an object, and a corresponding grayscale image of the object.

FIG. 3 illustrates a plurality of structured light patterns scanning 300 an object, and a corresponding grayscale image. Structured light uses projection of one or more known structured light patterns onto the scene 202. For example, as shown here the projector 206 may project the structured light 104 onto the object 106. The camera 210 recovers the image of the object 106, as well as other portions of the scene 202 in the field of view, and the projected structured light 104. By determining how the structured light 104 patterns have been distorted or shifted, a shape of the object 106 may be determined. A distance to the object 106 or depth of features on the surface of the object may be determined by tracking features within the patterns.

A first structured light pattern 302 is depicted herein. The pattern shown here comprises a series of vertical bars with intensities alternating between a first intensity 304 and a second intensity 306. In other implementations, other patterns may be used such as grids, points, pseudorandom noise, checker board, and so forth. The structured light patterns described herein may be projected using visible light, non-visible light, or a combination thereof. Non-visible light comprises light which is not visible to the unaided human eye, such as infrared or ultraviolet. These patterns may contain a plurality of edges 308.

The structured light patterns may be projected using visible light and configured such that they are imperceptible to the human eye. For example, a duration of time during which one pattern is projected may be below a perception threshold of a human user. Or in another implementation a series of inverted or complementary patterns may be projected such that over an integration time of the human eye, the structured light pattern is not perceived. These complementary patterns contain alternating values or opposing excursions in luminance, chrominance, or luminance and chrominance. For example, a first pattern may contain a pixel with a luminance of +2 while the second pattern may have the pixel set to a luminance of −2.

A projection duration of the first structured light pattern 302 and the second structured light pattern 314 may differ. For example, the first structured light pattern 302 may be presented for 10 milliseconds (ms) while the second structured light pattern 314 is presented for 12 ms.

In some implementations, the first intensity 304 shown here may correspond to a non-zero intensity level. The second intensity 306 may correspond to an intensity different from the first intensity 304 and up to a maximum intensity value. The intensity may be for a specific color of light, or overall luminance. In some implementations, structured light patterns with different colors may be used. This may improve acquisition of surface data when modeling objects which exhibit limited intensity changes in images of a particular color. For example, a red ball may be best imaged in green light.

An enlarged view shows a plurality of depth sample points 310(1), 310(2), . . . , 310(N). These depth sample points 310 correspond to particular points in an acquired image, such as at the edges 308 defined by an element of the projected structured light pattern. The edges 308 may be determined where the amplitude changes from one pixel to the next reaches a local maximal. The depth sample points 310 may be used by the structured light acquisition module 122 to determine a distance to that particular depth sample point 310. For example, the distance between two sample points may be used to determine the distance from the projector 206 to the point on the object 106.

A distortion 312 of the structured light pattern is also depicted. The distortion 312 provides data about the surface of the object 106 comprising a magnitude and direction of the distortion, relative size of pattern features in an acquired image, and so forth. The structured light acquisition module 122 uses the known structured light patterns and the resulting distortion 312 as imaged by the camera 210 to determine a distance to one or more of the depth sample points 310.

A second structured light pattern 314 is depicted, having a pattern which is the inverse of the first structured light pattern 302. In some implementations the first structured light pattern 302 and the second structured light pattern 314 may be configured such that they are shifted or translated relative to one another. For example, the second structured light pattern 302 may be displaced to the right one-half the width of the stripes in the pattern.

An average structured light pattern 316 is depicted. For example, over a 20 millisecond span of time, the interspersed projection of the first structured light pattern 302 with a duration of 10 ms and the second structured light pattern 314 having a duration of 10 ms is perceived as white or light gray by a human eye. A grayscale image 318 is acquired, observing the intensity of pixels in the acquired image. The grayscale image 318 may be imaged using a longer acquisition or integration time than that used for structured light image acquisition. For example, a camera may integrate the image over 20 ms. In some implementations the same or different cameras may be used to acquire the structured light and grayscale images.

In another implementation, the grayscale image 318 may be generated from images acquired during structured light pattern acquisition. For example, a first image acquired during presentation of the first structured light pattern 302 may be summed or subtracted from a second image acquired during presentation of the second structured light pattern 314. As described, data from the grayscale image 318 is used by the surface normal module 124 to determine surface normals and thus surface contours.

Figure 4:
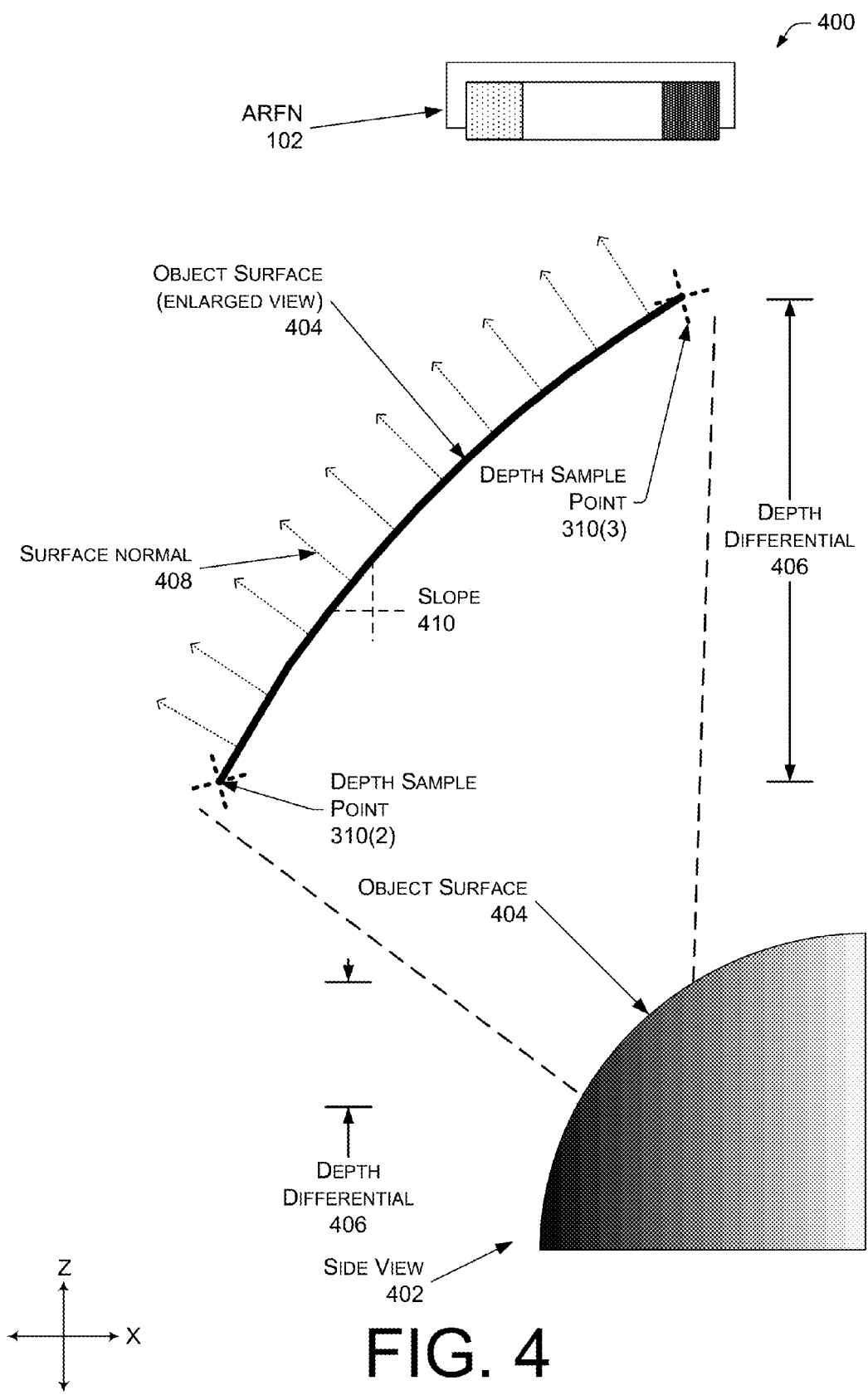
FIG. 4 illustrates an enlarged portion of the object as imaged in grayscale and illustrates a plurality of surface normals derived from the grayscale data.

FIG. 4 illustrates 400 an enlarged portion of the object 106 as imaged in grayscale. The overhead ARFN 102 is shown (not to scale), as oriented generally above the object 106. In other implementations and use cases, the ARFN 102 may be disposed at other locations relative to the object 106.

A side view 402 of a portion of the grayscale image 318 of a portion of the object 106 is shown. The object 106 has a surface 404. As shown here, a depth sample point 310(2) is displaced farther from the ARFN 102 than the depth sample point 310(3). A depth differential 406 is illustrated showing this distance between depth sample points 310. This depth differential 406 may be determined using depth or distance data from the depth sample points 310. For example, by subtracting the distance between the ARFN 102 and the depth sample point 310(2) from the distance between the ARFN 102 and the depth sample point 310(2), the depth differential 406 may be calculated. The depth differential 406 may be used to constrain the contours derived from the surface normals. The constraint may be to "peg" or fix at least a portion of the contour to a particular point in space. This constraint may be used to disambiguate possible contours.

An enlarged view of the object surface 404 depicts a plurality of determined surface normals 408. These surface normals 408 have no physical presence, but rather are representative of the geometry of the object surface. These surface normals are determined based at least in part on the intensity of pixels as imaged, the linear offset "O" between the projector 206 which may provide known illumination and the camera 210, and so forth. The surface normals 408 may be determined for individual pixels or groups or blocks of pixels.

By determining the surface normals 408 at many points, a contour of the object surface may be determined. However, the process of determining slope 410 from the surface normals 408 is not absolute. Thus, it is not feasible to determine a depth differential such as in millimeters between one side of the slope 410 and another. In contrast, the structured light acquisition module 122 is configured to use the structured light patterns to determine a distance or depth of a particular point. The surface model module 126 may "pin" or associate the depth sample points 310 with a particular distance, and fill in the contour between using the surface normals. As a result, the overall resolution of data acquired is dramatically improved compared to sampling using only edges, and the surface model module 126 has a large amount of data to use in reconstructing the object surface. As a result, the reconstruction is higher in resolution and more accurately reflects the actual object surface.

Figure 5:
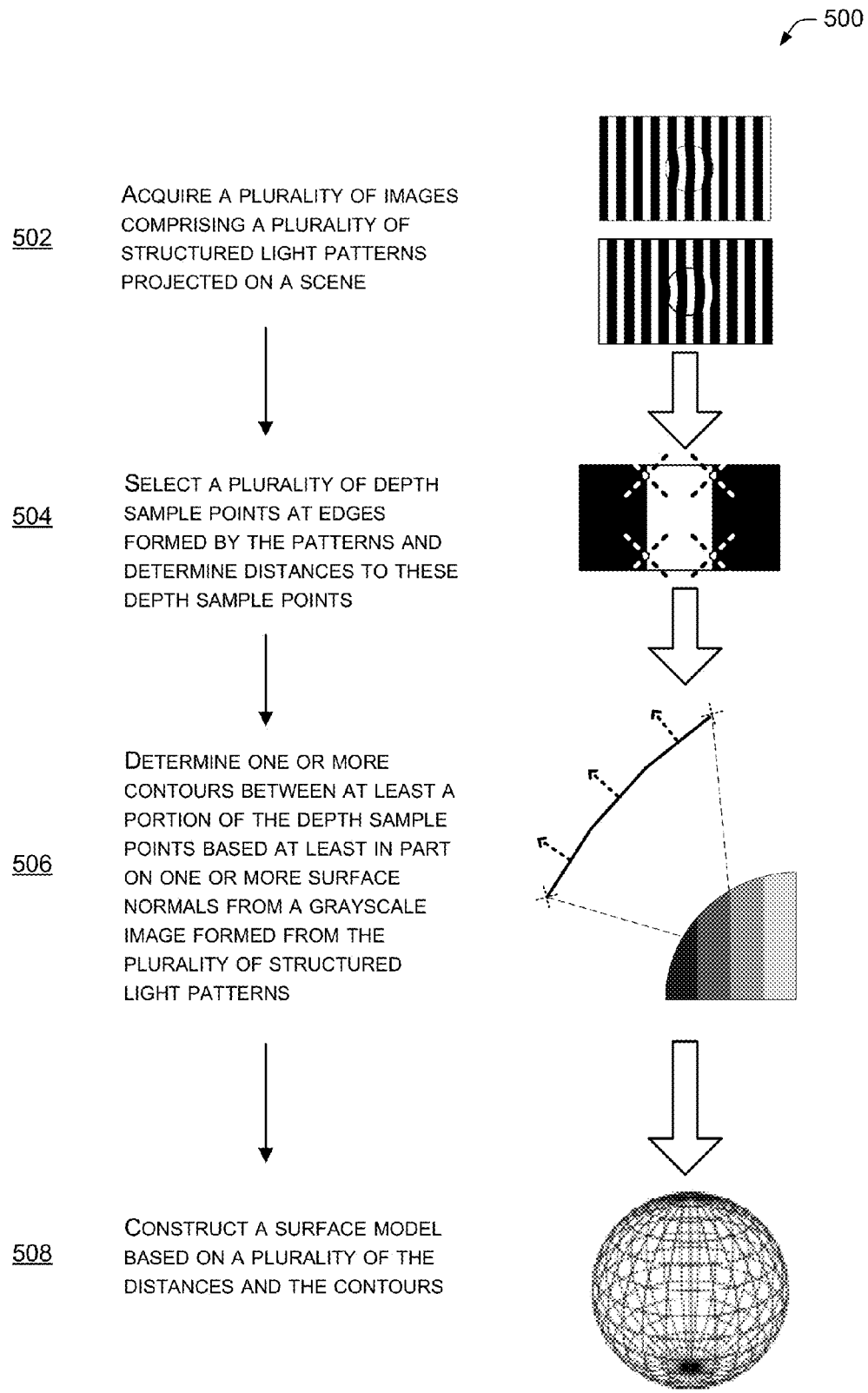
FIG. 5 illustrates operations used to generate a surface model from distance and contour information.

FIG. 5 illustrates operations 500 used to generate a surface model from distance and contour information. At 502, a plurality of images are acquired comprising a plurality of structured light patterns projected on the scene 202. During acquisition of an image, one of the structured light patterns is presented. For example, the structured light acquisition module 122 may initiate projection of the structured light patterns by the projector 206 and image acquisition by the camera 210.

At 504, a plurality of depth sample points 310 at edges 308 formed by the structured light patterns are selected and distances to these points determined. In one implementation where the projector 206 and the camera 210 are separated by the offset "O", the structured light acquisition module 122 may select the sample points 310 and determine the distance between the projector 206 and the points 310 on the object 106 based at least in part on a distance between the points 310 on the edges 308. For example, given the known structured light pattern, the farther apart the depth sample points 310 on the two or more edges 308 appear in an acquired image, the farther away the points are from the projector 206. Thus, the distance between the edges 308 may be used to determine the distance from the depth sample points 310 on those edges 308 and the projector 206. In other implementations, other techniques may be used to determine distance.

At 506, one or more contours are determined between at least a portion of the depth sample points 310. These contours are based at least in part upon one or more surface normals derived from a grayscale image 318, such as formed from the plurality of structured light patterns. In some implementations, the grayscale image 318 may be acquired at times when no structured light pattern is presented, or under ambient room light.

At 508, a surface model based on a plurality of the distances and the contours is generated. The distances to the depth samples points 310 are used to define endpoints for a start and stop point of the contour determined by the surface normals. This combination of measured distances in combination with relative changes to the surface thus may be used to generate a high resolution reconstruction of the object 106.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 6:
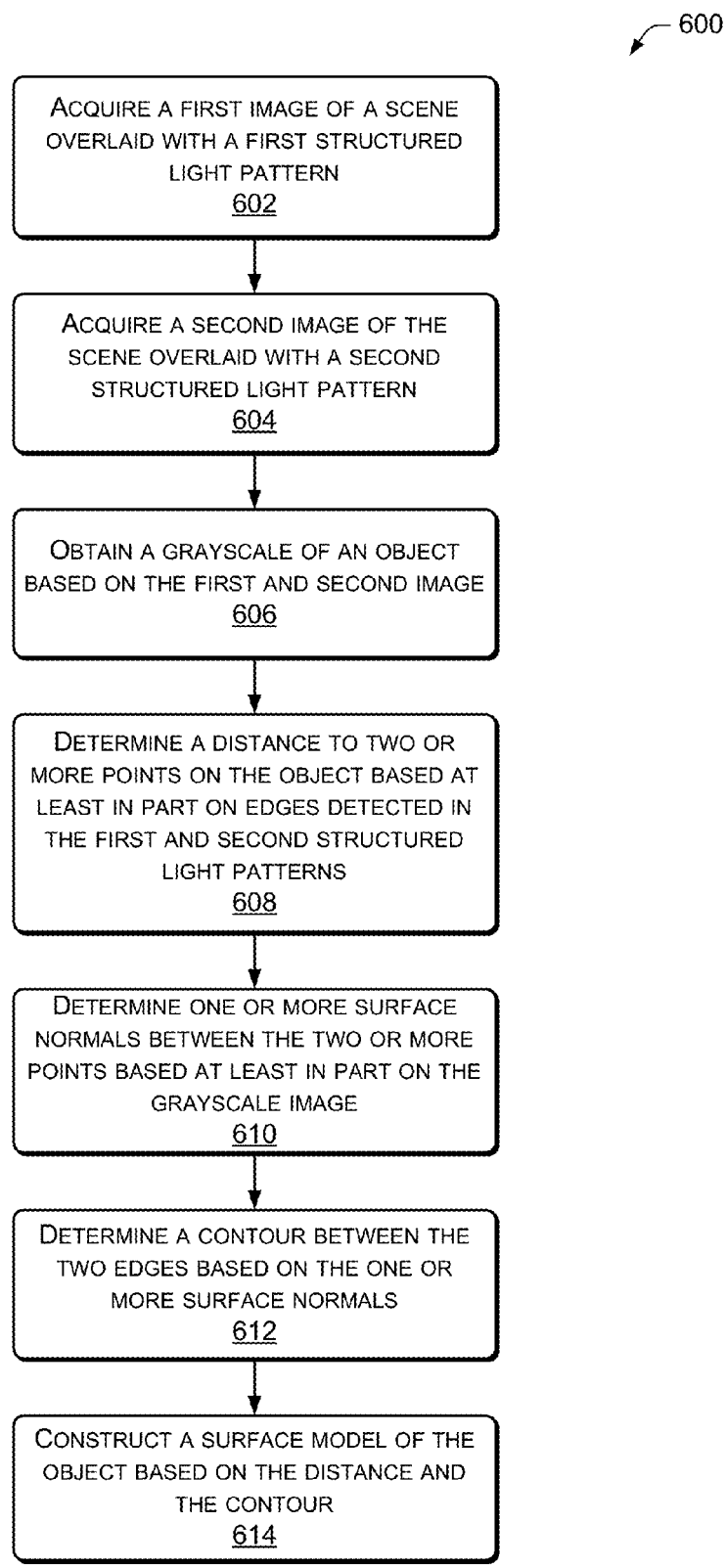
FIG. 6 is an illustrative process of constructing a surface model of the object using distance derived from structured light and contour information based on grayscale data.

FIG. 6 is an illustrative process 600 of constructing a surface model of at least a portion of the object using distance and slope information derived from structured light. At 602, a first image of the scene overlaid or illuminated with a first structured light pattern is acquired. For example, the projector 206 may project the first structured light pattern 302 and the camera 210 acquires the image of the pattern interacting with the object 106. At 604, a second image of the scene overlaid with a second structured light pattern is acquired. For example, the projector 206 may project the second structured light pattern 314 and the camera 210 acquires the image of the pattern interacting with the object 106.

At 606, a grayscale image of the object is obtained from and based on the first image and the second image. In some implementations, the grayscale image may be acquired using an integration time greater than or equal to the sum of durations for the structured light patterns.

At 608, a distance to two or more depth sampling points on the object is determined based at least in part on edges detected in the first and second structured light pattern. This distance is the distance between a designated origin point, such as the projector 206 in the ARFN 102 and the depth sampling point 310 on the object 106. For example, given known parameters of the projector 206 and the camera 210 and the known structured light pattern, the distance to the depth sampling points 310 may be calculated.

At 610, one or more surface normals are determined for the surface of the object between the two or more points based at least in part on the grayscale image. For example, the surface normal module 122 may assume a Lambertian surface and determine a surface normal based on the intensity of the pixel using this assumption.

At 612, a contour between the two edges on the surface based on the one or more surface normals is determined. This contour may comprise a slope of a straight line, a curve, and so forth.

At 614, a surface model of the object based on the distance and the contour is constructed. In some implementations, a preliminary surface model may be compared with similar surface models stored within the object datastore 118. When the preliminary surface model matches the stored surface models, the stored surface model data may be used. This surface model may comprise a portion of the surface of the object, or describe the entire surface of the object. In some implementations, data from a plurality of ARFNs 102 may be combined to provide data suitable for generating a more complete surface model.

Calibration

The ARFN 102 may contain several optical systems, such as the projector 206, camera 210, and so forth. Due to variations in manufacture, usage, environmental factors such as thermal expansion and contraction, and so forth, it may be beneficial to calibrate the system such that the surface model as generated accurately describes the actual surface of the object.

Figure 7:
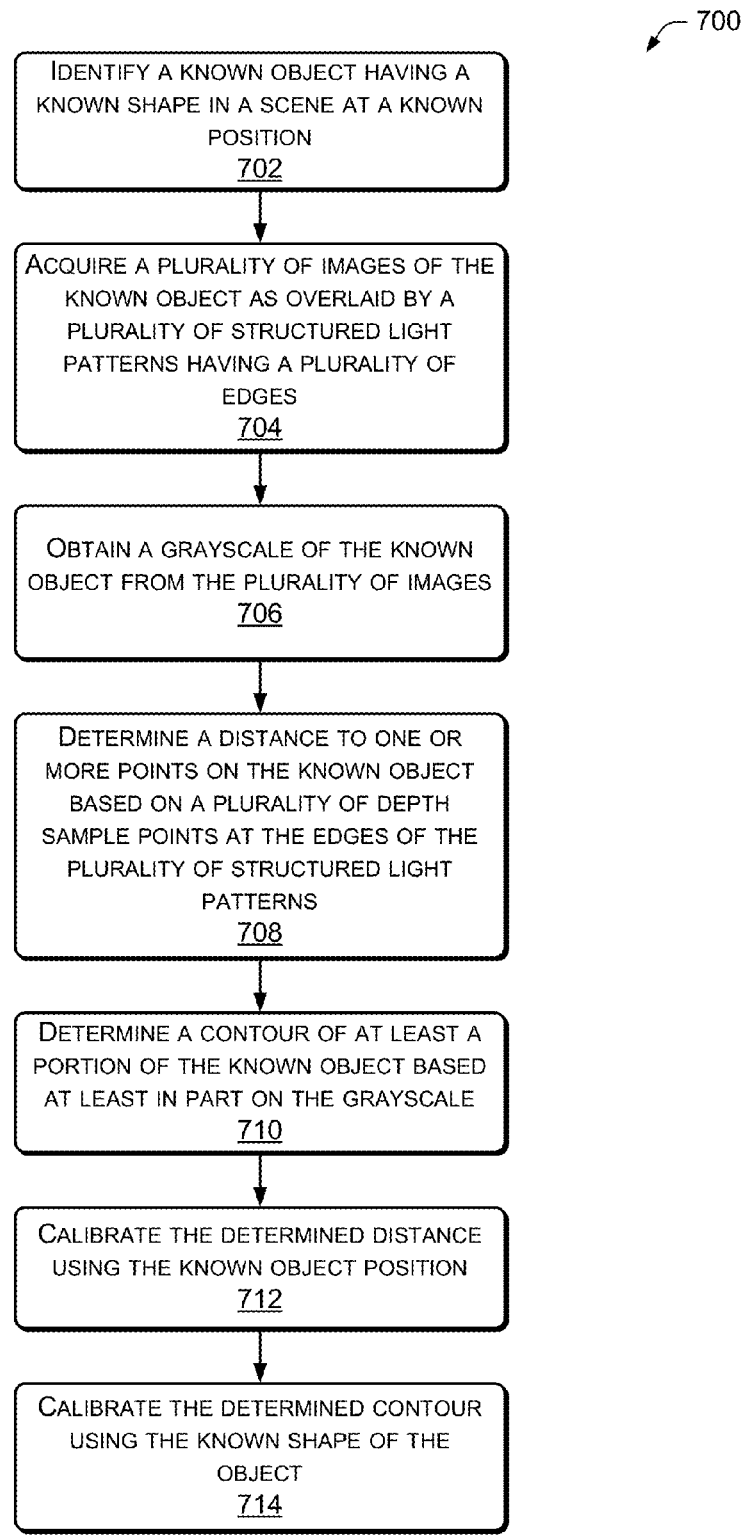
FIG. 7 is an illustrative process of calibrating the system for distance and contour.

FIG. 7 is an illustrative process 700 of calibrating the system for distance and contour. At 702, a known object having a known shape is identified in the scene at a known position. For example, the ARFN 102 may identify the known object based on a machine-readable optical code or text on the calibration object. A particular calibration location may be designated having a position within the scene 202 which is known relative to one or more of the ARFNs 102. The known object may be one specifically designed for calibration use, or may be an object having a previously determined topography and dimensions.

At 704, a plurality of images of the known object are acquired when illuminated or overlaid by a plurality of structured light patterns having a plurality of edges. At 706, a grayscale of the known object is obtained from the plurality of the images acquired while different structured light patterns are overlaid on the known object. In other implementations, the grayscale image 318 may be acquired separately.

At 708, a distance is determined to one or more points on the known object based on a plurality of depth sample points. These depth sample points 310 may be disposed at the edges 308 of the plurality of structured light patterns.

At 710, a contour of at least a portion of the known object based at least in part on the grayscale is determined. For example, the surface normal module 126 may use the grayscale to determine surface normals from which the contour of the known object surface is derived.

At 712, the determined distance is calibrated using the known object position. For example, a correction factor may be applied to reconcile the known object position and distance to points thereon with the determined distance.

At 714, the determined contour is calibrated using the known shape of the object. For example, the known object may comprise a series of convex shapes. A determined contour which is concave would be adjusted to reflect the known actuality of the known object's surface. As described above, the surface model of known objects may be stored within the object datastore 118.

Figure 8:
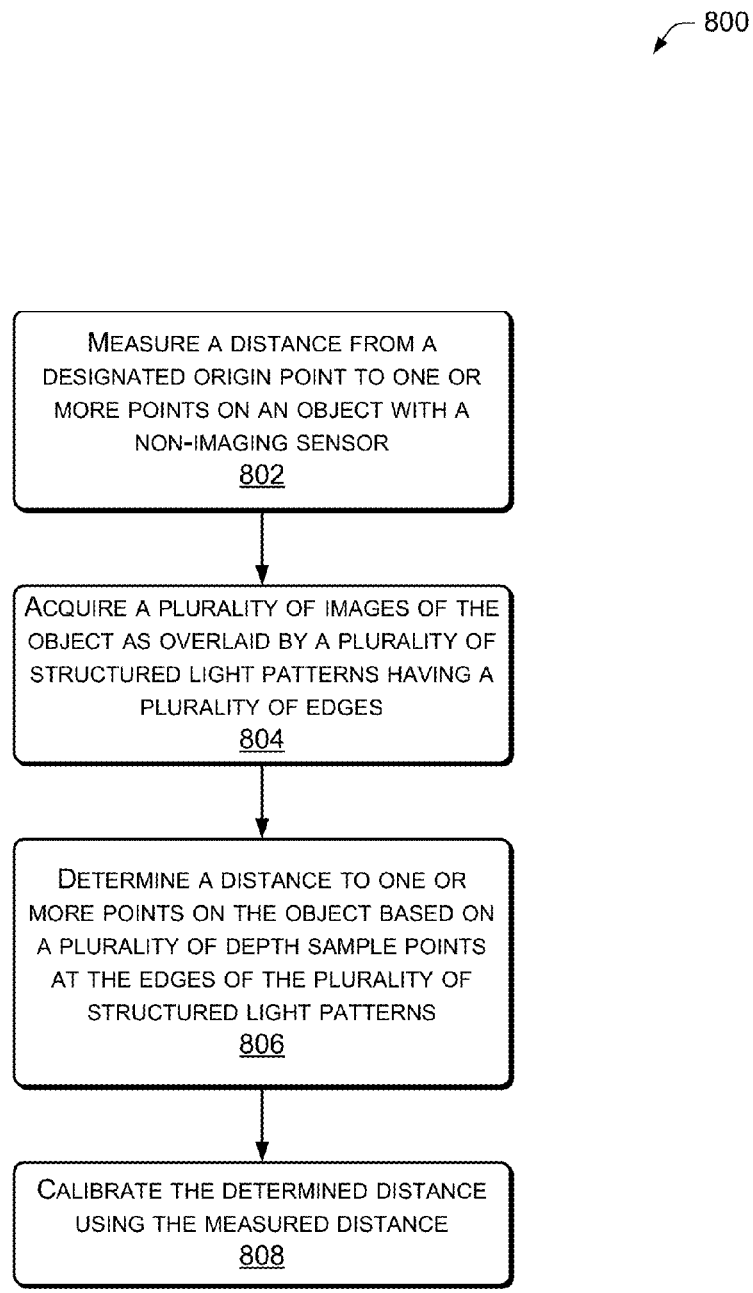
FIG. 8 is an illustrative process of calibrating the system for distance using a non-imaging sensor.

FIG. 8 is an illustrative process 800 of calibrating the system for distance using a non-imaging sensor. As described above with regards to FIG. 2, the ARFN 102 may contain a variety of other sensors. These other sensors may be used to provide calibration data for use by the surface model module 126.

At 802, a distance to one or more points on the object is measured with a non-imaging sensor. For example, the ranging system 226 may use LIDAR, the microphones 220 may use the time difference of arrival to determine a distance, or the ARFN 102 may pan and tilt varying the angle at which the object is imaged and thus determine the distance.

At 804, a plurality of images are acquired of the object when illuminated or overlaid by a plurality of structured light patterns. The structured light patterns may be configured to have a plurality of edges therein of projected features, such as the edges 308 along stripes.

At 806, a distance to one or more points on the object is determined based on a plurality of depth sample points at the edges of the plurality of the structured light patterns. At 808, the determined distance is calibrated using the measured distance. For example, the determined distance may be 1304 millimeters while the measured distance is 1311 mm. As a result, the surface model module 126 may apply a correction factor of +7 mm to bring the determined distance into agreement with the measured distance.

In some implementations the processes of FIGS. 7 and 8 may be combined. For example, a known object may be placed at an arbitrary position within the environment. Using the non-imaging sensor, the distance and position of the known object may be determined. Once determined, the distance, contour, or both may be calibrated.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a projector coupled to the one or more processors and configured to project first and second structured light patterns which overlay, at least in part, a surface of an object within an environment;
   a camera coupled to the one or more processors and configured to acquire images of the object while the first and second structured light patterns are overlaid onto the object;
   a memory coupled to the one or more processors; and
   a module stored within the memory and containing instructions, that when executed on the one or more processors perform at least the following acts:
   acquire, from the camera, a first image of the environment when the first structured light pattern is projected at least partially onto the object, the first structured light pattern comprising two or more edges;
   acquire, from the camera, a second image of the environment when the second structured light pattern is projected at least partially onto the object, the second structured light pattern also comprising two or more edges;
   obtain a grayscale image of the object and detect the two or more edges of the first and second structured light patterns based at least in part on the first image and the second image;
   determine distances between the camera and to two or more points on the object based at least in part on a distance within the acquired images between the two or more edges as detected in the first and second structured light patterns;
   determine, based at least in part on the grayscale image, one or more surface normals of a portion of the surface of the object between the two or more points;
   determine a contour between the two or more edges on the surface based at least in part on the one or more surface normals; and
   construct at least a portion of a surface model of the object based at least in part on the distances between the camera and the two or more points and the contour.

2. The system of claim 1, wherein the first structured light pattern and the second structured light pattern are projected such that the patterns when projected are imperceptible by a human eye.

3. The system of claim 1, wherein the contour comprises one or more curves or one or more straight segments having a slope.

4. The system of claim 1, wherein each of the one or more of the surface normals correspond to an individual pixel from at least a portion of pixels in the grayscale image.

5. The system of claim 1, wherein the determining of the one or more surface normals comprises assuming the surface of the object to be Lambertian.

6. The system of claim 1, wherein the first structured light pattern and the second structured light pattern are configured such that the patterns when projected have alternating values of luminance, chrominance, or luminance and chrominance.

7. One or more non-transitory computer-readable storage media storing instructions that, when executed by one or more processors, cause the one or more processors to perform acts comprising:
receiving a first image of an environment when a first structured light pattern having edges is projected onto the environment;
receiving a second image of the environment when a second structured light pattern having edges is projected onto the environment;
selecting a plurality of depth sample points at the edges formed by the first and second structured light patterns and determining distances from a designated origin point to the depth sample points;
determining, based at least in part on one or more surface normals determined from a grayscale image of the environment, a contour between at least two of the depth sample points; and
constructing a surface model of at least a portion of the environment based at least in part on the contour and the distances between the designated origin point and the depth sample points.

8. The one or more non-transitory computer-readable storage media of claim 7, wherein the determining the distances from the designated origin point to the depth sample points are based at least in part upon a distance between the depth sample points.

9. The one or more non-transitory computer-readable storage media of claim 7, wherein the grayscale image is obtained at least in part from the first and second images.

10. The one or more non-transitory computer-readable storage media of claim 7, wherein at least a portion of the first and second structured light patterns are projected onto the environment using different substantially monochromatic colors.

11. The one or more non-transitory computer-readable storage media of claim 10, wherein the substantially monochromatic colors include red, green, or blue.

12. The one or more non-transitory computer-readable storage media of claim 7, wherein the first and second structured light patterns when projected onto the environment are imperceptible to a human.

13. The one or more non-transitory computer-readable storage media of claim 7, wherein the determining the contour is constrained by a depth differential derived from the distances between the designated origin point and the plurality of depth sample points.

14. The one or more non-transitory computer-readable storage media of claim 7, wherein the contour comprise a slope or a relative angle of an object surface within the environment.

15. One or more non-transitory computer-readable storage media storing instructions that, when executed by one or more processors, cause the one or more processors to perform acts comprising:
identifying, in an environment, a known object having a known shape at a known position in the environment;
acquiring a first image of the known object when illuminated by a first structured light pattern comprising a plurality of edges;
acquiring a second image of the known object when illuminated by a second structured light pattern comprising a plurality of edges;
obtaining a grayscale image of the known object at least in part from the first and second images;
determining a distance between a designated origin point and one or more points on the known object based at least in part on a plurality of depth sample points at the edges of the first and second structured light patterns;
determining a contour of at least a portion of the known object based at least in part on one or more surface normals derived from the grayscale image;
calibrating the determined distance using the known position of the known object in the environment; and
calibrating the determined contour using the known shape of the known object.

16. The one or more non-transitory computer-readable storage media of claim 15, wherein the identifying comprises imaging and recognizing one or more optical markings disposed on the known object.

17. The one or more non-transitory computer-readable storage media of claim 15, wherein the first and second structured light patterns are configured such that they are imperceptible to a human when projected.

18. One or more non-transitory computer-readable storage media storing instructions that, when executed by one or more processors, cause the one or more processors to perform acts comprising:
measuring a distance from a designated origin point to an object with a non-imaging sensor to determine a measured distance;
acquiring a first image of the object when illuminated by a first structured light pattern having a plurality of edges;
acquiring a second image of the object when illuminated by a second structured light pattern having a plurality of edges;
generating a determined distance to one or more depth sample points disposed at the edges of the first and second of structured light patterns;
calibrating the determined distance using the measured distance;
obtaining a grayscale image at least in part from the first and second images; and
determining a contour between at least two depth sample points based at least in part on one or more surface normals derived from the grayscale image and constrained by the measured distance between the designated origin point and the at least two depth sample points.

19. The one or more non-transitory computer-readable storage media of claim 18, wherein the non-imaging sensor is configured to measure the distance from the designated origin point to the object with an acoustic signal.

* * * * *